(12) United States Patent
Kim et al.

(10) Patent No.: US 8,992,341 B2
(45) Date of Patent: Mar. 31, 2015

(54) INJECTION MOLDABLE COMPOSITIONS AND GOLF BALLS PREPARED THEREFROM

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 927 days.

(21) Appl. No.: 12/646,775

(22) Filed: Dec. 23, 2009

(65) Prior Publication Data

US 2011/0152008 A1    Jun. 23, 2011

(51) Int. Cl.
| | |
|---|---|
| *A63B 37/06* | (2006.01) |
| *A63B 37/00* | (2006.01) |
| *A63B 37/02* | (2006.01) |
| *A63B 45/00* | (2006.01) |
| *B29C 45/00* | (2006.01) |
| *B29C 45/16* | (2006.01) |

(52) U.S. Cl.
CPC ............. *A63B 45/00* (2013.01); *A63B 37/0003* (2013.01); *A63B 37/0038* (2013.01); *A63B 37/0043* (2013.01); *A63B 37/0045* (2013.01); *A63B 37/02* (2013.01); *B29C 45/0001* (2013.01); *B29C 45/16* (2013.01)
USPC ........................................................ 473/376

(58) Field of Classification Search
USPC .................... 473/370, 371, 374, 376
See application file for complete search history.

(56) References Cited

U.S. PATENT DOCUMENTS

| | | | |
|---|---|---|---|
| 3,804,803 A | 4/1974 | Streck et al. | |
| 3,974,092 A | 8/1976 | Streck et al. | |
| 4,049,616 A * | 9/1977 | Scott et al. | 524/532 |
| 4,115,475 A | 9/1978 | Foy et al. | |
| 4,123,061 A | 10/1978 | Dusbiber | |
| 4,153,772 A | 5/1979 | Schwesig et al. | |

(Continued)

FOREIGN PATENT DOCUMENTS

| | | |
|---|---|---|
| JP | 62267357 | 11/1987 |
| JP | 63221157 | 9/1988 |

(Continued)

OTHER PUBLICATIONS http://www.chemsoc.org/chembytes/ezine/2002/birkett_july02.htm (accessed on Nov. 1, 2006).

(Continued)

*Primary Examiner* — Stephen L. Blau
(74) *Attorney, Agent, or Firm* — Klarquist Sparkman, LLP

(57) ABSTRACT

A golf ball is disclosed which includes a Single Component Region which includes greater than 75% by weight of an injection moldable rubber and one or more Discrete Hardness Regions within the Single Component Region. The golf ball may optionally also include a core, an outer cover layer and one or more intermediate layers.

Also disclosed are methods of preparing a golf ball including a Single Component Region which includes greater than 75% by weight of an injection moldable rubber and one or more Discrete Hardness Regions within the Single Component Region, whereby the Single Component Region is formed either by sequentially injection molding layers of a polyalkenamer rubber followed by co-curing the resulting structure, or by injection molding one or more pairs of half shells of a polyalkenamer rubber composition, followed by stacking the half shells to form a golf ball precursor structure followed by co-curing the resulting structure.

10 Claims, 3 Drawing Sheets

(56) References Cited

U.S. PATENT DOCUMENTS

| | | | |
|---|---|---|---|
| 4,183,876 A | 1/1980 | Coran et al. | |
| 4,195,015 A | 3/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,546,980 A | 10/1985 | Gendreau et al. | |
| 4,570,937 A * | 2/1986 | Yamada | 473/377 |
| 4,726,590 A | 2/1988 | Molitor | |
| 4,728,693 A | 3/1988 | Dröscher et al. | |
| 4,755,552 A | 7/1988 | Jadamus et al. | |
| 4,792,141 A | 12/1988 | Llort | |
| 4,838,556 A | 6/1989 | Sullivan | |
| 4,840,993 A | 6/1989 | Bartz | |
| 4,844,471 A | 7/1989 | Terence et al. | |
| 4,852,884 A | 8/1989 | Sullivan | |
| 4,894,411 A | 1/1990 | Okada et al. | |
| 4,950,826 A | 8/1990 | Zerpner et al. | |
| 4,955,966 A | 9/1990 | Yuki | |
| 5,255,922 A | 10/1993 | Proudfit | |
| 5,334,673 A | 8/1994 | Wu | |
| 5,385,776 A | 1/1995 | Maxfield et al. | |
| 5,436,295 A | 7/1995 | Nishikawa et al. | |
| 5,439,227 A * | 8/1995 | Egashira et al. | 473/373 |
| 5,460,367 A | 10/1995 | Horiuchi | |
| 5,697,856 A * | 12/1997 | Moriyama et al. | 473/374 |
| 5,885,172 A | 3/1999 | Hebert et al. | |
| 5,948,862 A | 9/1999 | Sano et al. | |
| 5,959,059 A | 9/1999 | Vedula et al. | |
| 5,962,553 A | 10/1999 | Ellsworth | |
| 6,012,991 A | 1/2000 | Kim et al. | |
| 6,093,357 A | 7/2000 | Bissonette et al. | |
| 6,100,321 A | 8/2000 | Chen | |
| 6,180,722 B1 * | 1/2001 | Dalton et al. | 525/193 |
| 6,329,458 B1 | 12/2001 | Takesu et al. | |
| 6,426,387 B1 | 7/2002 | Kim | |
| 6,435,986 B1 | 8/2002 | Wu et al. | |
| 6,476,176 B1 | 11/2002 | Wu | |
| 6,485,378 B1 | 11/2002 | Boehm | |
| 6,508,724 B2 | 1/2003 | Dalton | |
| 6,537,158 B2 | 3/2003 | Watanabe | |
| 6,562,906 B2 | 5/2003 | Chen | |
| 6,569,037 B2 | 5/2003 | Ichikawa et al. | |
| 6,582,326 B2 | 6/2003 | Wu et al. | |
| 6,616,552 B2 | 9/2003 | Takesue et al. | |
| 6,635,716 B2 | 10/2003 | Voorheis et al. | |
| 6,692,379 B2 | 2/2004 | Morgan et al. | |
| 6,762,244 B2 | 7/2004 | Rajogopalan et al. | |
| 6,770,360 B2 | 8/2004 | Mientus et al. | |
| 6,776,942 B2 | 8/2004 | Kim | |
| 6,780,126 B2 | 8/2004 | Ladd et al. | |
| 6,794,447 B1 | 9/2004 | Kim et al. | |
| 6,812,276 B2 | 11/2004 | Yeager | |
| 6,835,146 B2 | 12/2004 | Jordan et al. | |
| 6,861,474 B2 | 3/2005 | Kim | |
| 6,878,075 B2 | 4/2005 | Kim | |
| 6,905,423 B2 | 6/2005 | Morgan et al. | |
| 6,919,395 B2 | 7/2005 | Rajagopalan et al. | |
| 6,930,150 B2 | 8/2005 | Kim | |
| 6,960,629 B2 | 11/2005 | Voorheis et al. | |
| 7,041,769 B2 | 5/2006 | Wu et al. | |
| 7,332,533 B2 | 2/2008 | Kim et al. | |
| 7,528,196 B2 | 5/2009 | Kim et al. | |
| 7,537,530 B2 * | 5/2009 | Bulpett et al. | 473/374 |
| 7,874,940 B2 * | 1/2011 | Kim et al. | 473/377 |
| 8,096,899 B2 * | 1/2012 | Kim et al. | 473/377 |
| 8,123,631 B2 * | 2/2012 | Sullivan et al. | 473/376 |
| 8,152,653 B2 * | 4/2012 | Sullivan | 473/373 |
| 2001/0005699 A1 | 6/2001 | Morgan et al. | |
| 2001/0019971 A1 | 9/2001 | Hayashi et al. | |
| 2002/0040111 A1 | 4/2002 | Rajagopalan | |
| 2002/0045499 A1 | 4/2002 | Takemura et al. | |
| 2003/0119989 A1 | 6/2003 | Ladd et al. | |
| 2003/0158312 A1 | 8/2003 | Chen | |
| 2003/0224871 A1 | 12/2003 | Kim et al. | |
| 2004/0019138 A1 * | 1/2004 | Voorheis et al. | 524/100 |
| 2004/0082408 A1 * | 4/2004 | Sullivan et al. | 473/371 |
| 2004/0092336 A1 | 5/2004 | Kim et al. | |
| 2004/0209708 A1 | 10/2004 | Bulpett et al. | |
| 2004/0236030 A1 | 11/2004 | Kim et al. | |
| 2004/0248669 A1 | 12/2004 | Kim et al. | |
| 2005/0059756 A1 | 3/2005 | Kim et al. | |
| 2006/0014898 A1 | 1/2006 | Kim | |
| 2006/0166761 A1 | 7/2006 | Kim et al. | |
| 2006/0166762 A1 * | 7/2006 | Kim et al. | 473/374 |
| 2008/0090678 A1 * | 4/2008 | Kim et al. | 473/378 |
| 2009/0191981 A1 | 7/2009 | Kim et al. | |

FOREIGN PATENT DOCUMENTS

| | | |
|---|---|---|
| JP | 2001-218872 | 8/2001 |
| JP | 2002-65896 A | 3/2002 |

OTHER PUBLICATIONS http://bppetrochemicals.com (accessed on Nov. 1, 2006) (http://bp.com/modularhome.do?_categoryId=6110).

http://www.nml.csir.co.za/news/20020711/index1.htm. (accessed on May 29, 2007).

English translation of Notice of Reasons for Rejection from the Japanese Patent Office dated Oct. 22, 2008 in Japanese Patent Application No. 2006-014614.

Non-Final Office Action from U.S. Appl. No. 11/335,070 dated Jul. 8, 2008.

Non-Final Office Action from U.S. Appl. No. 12/415,522 dated Dec. 5, 2011.

English translation of Japanese Office Action from corresponding Japanese Application No. 2010-272447 dated Aug. 7, 2012.

* cited by examiner

INJECTION MOLDABLE COMPOSITIONS AND GOLF BALLS PREPARED THEREFROM

BACKGROUND

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, three-piece or multi-layered golf balls. One-piece balls are molded from a homogeneous mass of material with a dimple pattern molded thereon. One-piece balls are inexpensive and very durable, but do not provide great distance because of relatively high spin and low velocity. Two-piece balls are made by molding a cover around a solid rubber core. These are the most popular types of balls in use today. In attempts to further modify the ball performance especially in terms of the distance such balls travel and the feel transmitted to the golfer through the club on striking the ball, the basic two piece ball construction has been further modified by the introduction of additional layers between the core and outer cover layer. If one additional layer is introduced between the core and outer cover layer a so called "three-piece ball" results and similarly if two additional layers are introduced between the core and outer cover layer, a so called "four-piece ball" results, and so on. In addition, so called "dual core" balls have been made in which the central rubber core is made from two discrete sections of the synthetic rubber material each section having different properties such as compression, resilience, hardness and durability. Even more recently, balls have been introduced having both dual cores and additional thin intermediate layers between the dual core and outer cover layer.

The synthetic rubber formulations used for the core compositions of modern golf balls are based on polybutadiene, especially cis-1,4-polybutadiene. In order to tailor the properties of the core, the polybutadiene is often further formulated with crosslinking agents, such as sulfur or peroxides, or by irradiation, as well as co-crosslinking agents such as zinc diacrylate. In addition, the weight and hardness of the core may be further adjusted by the incorporation of various filler materials in the rubber formulation. Thus, there is a great deal of literature concerning such formulation chemistry and the variation of the rubber composition and degree of cross linking such that cores may be produced with the required compression, resilience, hardness and durability.

After core formation, any intermediate layers and finally the golf ball outer cover and are typically formed over the core using one of three methods: casting, injection molding, or compression molding. Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold.

In contrast, compression molding of a ball cover or intermediate layer typically requires the initial step of making half shells by injection molding the layer material into an injection mold. The half shells then are positioned in a compression mold around a ball core, whereupon heat and pressure are used to mold the half shells into a complete layer over the core, with or without a chemical reaction such as crosslinking. Compression molding also can be used as a curing step after injection molding. In such a process, an outer layer of thermally curable material is injection molded around a core in a cold mold. After the material solidifies, the ball is removed and placed into a mold, in which heat and pressure are applied to the ball to induce curing in the outer layer.

Of the various cover molding processes, injection molding is most preferred, due to the efficiencies gained by its use including a more rapid cycle time, cheaper operating costs and an improved ability to produce thinner layers around the core and closely control any thickness variation. This latter advantage is becoming more important with the developments of multi-layered balls with two or more intermediate layers between the core and cover thus requiring thinner layer formation. Such multilayered golf balls are often fabricated with chemically distinct layers to produce various combinations of hardness, modulus and other properties in order to tailor the resulting principal performance categories, including ball velocity, compression, spin and distance. However, in addition to being time consuming and expensive and imparting additional complexity to golf ball preparation, due to their differing chemical compositions, the individual layers often suffer from delamination often manifested as poor shear performance.

One such chemical composition used especially on early golf ball outer cover layers was naturally occurring balata rubber. One deficiency of balata is the ease with which it is cut or sheared leading to low durability of the ball. As an alternative, there were a number of early attempts to incorporate synthetic cis 1,4-polybutadiene rubber, as a layer around a central core or as an outer cover layer. For example, U.S. Pat. No. 3,784,209 exemplifies a ball prepared by forming a center of a first cis 1,4-polybutadiene formulation and forming a outer cover layer around it of a second cis 1,4-polybutadiene formulation and finally curing the resulting golf ball precursor in a compression molding step. Also, U.S. Pat. No. 4,625,964 exemplifies a golf ball having a central core made from cis 1,4-polybutadiene around which was compression molded two half shells previously prepared from another cis 1,4-polybutadiene formulation to form a second layer. The ball was completed by injection molding an ionomer outer cover layer. U.S. Pat. No. 4,714,253 exemplifies a golf ball having a central core formed from a first cis 1,4-polybutadiene formulation followed by forming an second layer from another cis 1,4-polybutadiene formulation. Two pre-formed ionomer half shells were then pressure molded around the two piece solid core to form the final golf ball. U.S. Pat. No. 4,848,770 exemplifies a three piece solid golf ball having a center produced from a highly filled cis 1,4-polybutadiene formulation and second layer produced from a second unfilled cis 1,4-polybutadiene formulation, followed by compression molding two ionomer half shells to form the outer cover layer.

However because of the relatively high viscosity of cis 1,4-polybutadiene formulations at normal injection molding temperatures, which becomes even more pronounced if such formulations also include filler, these formulations are not easily adaptable to traditional thin layer-forming injection molding techniques. Thus the current evolution in golf balls technology favors the use of thermoplastic materials such as ionomers or thermoplastic polyurethane in golf ball covers and intermediate layers, which materials are much more amenable to modern thin layer injection molding techniques.

In addition to the polybutadiene-based synthetic rubbers, another synthetic rubber available for use in golf balls, are the so-called "polyalkenamers". These synthetic rubbers are unique in that in addition to a liner polymeric component, they also contain a significant fraction of cyclic oligomer molecules, which in turn lowers their viscosity. Compounds of this class can be produced in accordance with the teachings of U.S. Pat. Nos. 3,804,803, 3,974,092 and 4,950,826, the entire contents of all of which are herein incorporated by reference.

To date, this material has been utilized primarily in blends with other polymers. For instance, U.S. Pat. No. 4,183,876 describes compositions comprising 15-95 parts by weight crystalline polyolefin resin and correspondingly 85-5 parts by weight cross-linked polyalkenamer rubber per 100 total parts by weight of resin and rubber. The resulting moldable thermoplastic compositions were said to exhibit improved strength and greater toughness and impact resistance than similar compositions containing substantially uncross-linked rubber. U.S. Pat. No. 4,840,993 describes a polyamide molding compound consisting of a mixture of 60 to 98% by weight of a polyamide and 2 to 40% by weight of a polyalkenamer, wherein the mixture is treated at elevated temperatures with 0.05 to 5% by weight of an organic radical source. No mention was made of the use of such compositions in balls including golf balls.

However, there a number of applications of polyalkenamer blends in game balls of various kinds. For example, U.S. Pat. No. 5,460,367 describes a pressureless tennis ball comprising a blend of trans-polyoctenamer rubber and natural rubber or other synthetic rubbers, e.g. cis-1,4-polybutadiene, trans-polybutadiene, polyisoprene, styrene-butadiene rubber, ethylene-propylene rubber or an ethylene-propylene-diene rubber (EPDM).

Also, U.S. Pat. No. 4,792,141 describes a golf ball comprising a core and a cover wherein the cover is formed from a composition comprising about 97 to about 60 parts balata and about 3 to about 40 parts by weight polyoctenylene rubber based on 100 parts by weight polymer in the composition. This patent also discloses that using more than about 40 parts by weight of polyoctenylene based on 100 parts by weight polymer in the composition has been found to produce deleterious effects.

However, it would be highly advantageous to have an injection moldable rubber composition with the soft feel of a rubber such as balata, but of sufficiently low viscosity to allow the material to be injection molded. It would also be highly advantageous if the properties of such a rubber composition could be tailored by similar formulation chemistry to that which has evolved through the use of crosslinked filled polybutadiene compositions used in core construction It would also be highly advantageous to be able to form a golf ball based on a single injection moldable rubber composition having different cure packages in order to achieve the desired hardness and or density gradient necessary for optimum ball performance, while also providing high COR and, if used as an outer cover layer, excellent shear cut and delamination resistance.

The present disclosure provides a golf ball comprising an injection moldable polyalkenamer rubber composition wherein the golf ball has a region in the golf ball made from a single polyalkenamer base resins but having one or more hardness regions within the single component region.

The present disclosure also provides processes for preparing a golf ball by sequentially injection molding layers of polyalkenamer rubber compositions with the required curative packages all having a sufficiently low viscosity at and below normal peroxide decomposition temperatures to allow the material to be injection molded to form a golf ball followed by compression molding the resulting golf ball or golf ball precursor to form a region in the golf ball made from a polyalkenamer component but having one or more hardness regions within the single component region.

The present disclosure also provides processes for preparing a golf ball by injection molding half shells of polyalkenamer rubber compositions having a sufficiently low viscosity at and below normal peroxide decomposition temperatures to allow the material to be injection molded to form a half shells all formed from a polyalkenamer as the base resin each half shell comprising different curative packages, followed by combining the half shells around a golf ball core and compression molding the resulting golf ball or golf ball precursor to form a region in the golf ball made from a single polyalkenamer base resins but having one or more hardness regions within the single component region.

SUMMARY

According to one embodiment there is disclosed a golf ball including a geometric center, an outer surface, a single component region which spans the distance from the geometric center to the outer surface of the golf ball, and optionally one or more intermediate layers, and where the single component region includes greater than 75% by weight of an injection moldable rubber.

According to another embodiment there is disclosed a golf ball including a geometric center; an outer cover layer having an inner and outer surface; a single component region which spans the distance from the geometric center of the ball to the inner surface of the outer cover layer; optionally one or more intermediate layers; and where the single component region includes greater than 75% by weight of an injection moldable rubber.

According to another embodiment there is disclosed a golf ball including a golf ball core having a geometric center and an outer surface; an outer cover layer having an inner and outer surface; a single component region which spans the distance from the outer surface of said golf ball core to the inner surface of said outer cover layer; and optionally one or more intermediate layers; and where the single component region includes greater than 75% by weight of an injection moldable rubber.

According to another embodiment there is disclosed a method of preparing a golf ball, the golf ball including a single component region where the single component region includes from about 1 to about 10 discrete hardness regions, each discrete hardness region having a thickness of from about 0.01 to about 0.84 inches and where the single component region includes greater than 80% by weight of a polyalkenamer, the method including the steps of;

1) forming a blend of a polyalkenamer rubber and a first crosslinking package;

2) injection molding the blend from step 1 to form an initial layer of the polyalkenamer of the required dimensions and, 3) forming a blend of a polyalkenamer rubber and a different crosslinking package from that used in step 1;

4) injection molding the blend from step 3 to form a second layer of the polyalkenamer of the required dimensions and, 5) optionally repeating steps 3 and 4 as required;

3) co-curing the structure resulting from steps 1 to 5 to form a single composite region of a crosslinked polyalkenamer composition with discrete hardness regions.

According to another embodiment, there is disclosed a method of preparation of a golf ball, the golf ball including a single component region where the single component region includes from about 1 to about 10 discrete hardness regions, each discrete hardness region having a thickness of from about 0.01 to about 0.84 inches and where the single component region comprises greater than 80% by weight of a polyalkenamer, the method including the steps of;

1) forming a blend of a polyalkenamer rubber and a first crosslinking package;

2) injection molding the blend from step 1 to form a pair of half shells of the required dimensions and, 3) forming a blend of a polyalkenamer rubber and a different crosslinking package from that used in step 1;

4) injection molding the blend from step 3 to form a second pair of half shells of the required dimensions and, 5) optionally repeating steps 3 and 4 as required;

6) stacking together the half shells from steps 1) to 5); and 7) co-curing the structure resulting from 1) and 2) to form a single composite region of a crosslinked polyalkenamer composition with discrete hardness regions.

The foregoing and other features and advantages will become more apparent from the following detailed description, which proceeds with reference to the accompanying figures.

DETAILED DESCRIPTION

Figure 1:
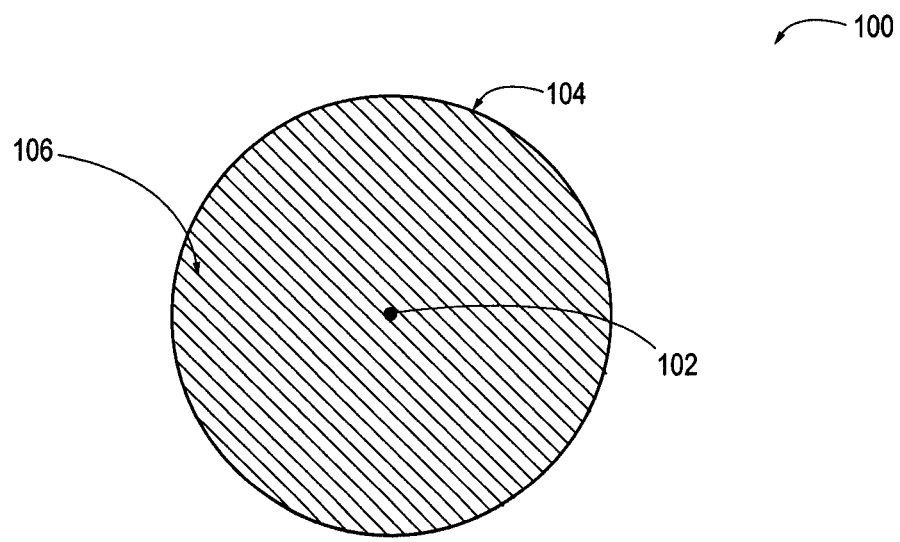
FIG. 1 shows a Single Region Ball of the present invention where the Single Component Region is the region from the geometric center of the golf ball to the outer ball surface.

For ease of understanding, the following terms used herein are described below in more detail:

The term "(meth)acrylic acid copolymers" refers to copolymers of methacrylic acid and/or acrylic acid.

The term "(meth)acrylate" refers to an ester of methacrylic acid and/or acrylic acid.

The term "partially neutralized" refers to an ionomer with a degree of neutralization of less than 100 percent.

The term "hydrocarbyl" includes any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymer's molecular weight distribution curve, i.e., the molecular weight distribution curve for the total polymer product shows only a single maximum.

The term "polyalkenamer" is used interchangeably herein with the term "polyalkenamer rubber" and means a rubbery polymer of one or more cycloalkenes having from 4-20, ring carbon atoms. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference.

As used herein, the term "injection moldable" as applied to the rubber compositions used as described herein refers to a material amenable to use in injection molding apparatus designed for use with typical thermoplastic resins. In one example, the term injection moldable composition as applied to the uncrosslinked rubbers used in the present disclosure means compositions having a viscosity using a Dynamic Mechanical Analyzer (DMA) and ASTM D4440 at 200° C. of less than about 5,000 Pa-sec, preferably less than about 3,000 Pa-sec, more preferably less than about 2,000 Pa-sec and even more preferably less than about 1,000 Pa-sec. and a storage modulus (G') at 1 Hz measured using a Dynamic Mechanical Analyzer (DMA) and ASTM D4065, and ASTM D4440, at 25° C., and 1 Hz of greater than about $1\times10^7$ dyn/cm$^2$, preferably greater than about $1.5\times10^7$ dyn/cm$^2$, more preferably greater than about $1\times10^8$ dyn/cm$^2$, and most preferably greater than about $2\times10^8$ dyn/cm$^2$.

The term "solid core" as used herein refers to the elastic center of a golf ball, which is a solid sphere having a geometric center and an outer surface and comprising a resilient polymer and having a unitary construction.

The term "core outer surface" as used herein refers to the outer surface of the solid core.

The term "outer cover layer" as used herein refers to the outermost cover layer of the golf ball; the layer having 1) an outer surface of the outer cover layer which is the layer that is directly in contact with paint and/or ink on the surface of the golf ball and on which the dimple pattern is formed and 2) an inner surface of the outer cover layer spaced inwardly from the outer surface towards the geometric center of the golf ball.

The term "golf ball outer surface" as used herein is the surface of the golf ball which is directly in contact with the paint and/or ink and on which the dimple pattern is placed. When the golf ball has an outer cover layer, the outer surface of the outer cover layer is also the golf ball outer surface.

The term "Single Component Region" (SCR) as used herein, describes a region of a golf ball in which the polymeric chemical composition comprises greater than 70, preferably greater than 75, more preferably greater than 80 and even more preferably greater than 85, and most preferably greater than 90 wt % (based on the weight of polymeric components in the SCR) of an injection moldable rubber component. For the avoidance of doubt this weight fraction is calculated only on the basis of the polymeric content of the SCR, and is not a weight percent based on the total composition or final weight of the SCR which may include large amounts of filler and other components of a crosslinking package such as zinc diacrylate and zinc oxide which if included as a basis for the weight fraction calculation would significantly lower the effective concentration of the polymeric component such as the polyalkenamer. If filler and all the components of the crosslinking package are included then the injection moldable rubber component would be present in an amount of greater than 30, preferably greater than 35 and more preferably greater than 40 wt % based on the final weight of the Single Component Region.

The term "Discrete Hardness Region" (DHR) as used herein, means a region in the SCR of the golf ball having a thickness as measured laterally in the direction from the geometric center to the outer surface of the golf ball of from about 0.01 to about 0.84, preferably of from about 0.015 to about 0.825, more preferably of from about 0.02 to about 0.5, even more preferably of from about 0.02 to about 0.20, and most preferably of from about 0.02 to about 0.1 in., and wherein, within such Discrete Hardness Region, the Shore D hardness at any point in the region varies by less than 5, preferably less than 4, more preferably less than 3 Shore D. The Discrete Hardness Regions of the golf balls of the present invention may also have a hardness greater than about 25, preferably greater than about 30, more preferably greater than about 40, and most preferably greater than about 50, Shore D units. Each DHR may have a hardness that is different compared to at least one other DHR in the golf ball. Each DHR may have a hardness that is different compared to an adjacent DHR in the golf ball.

The Discrete Hardness Regions of the golf balls may also have a flexural modulus from about 5 to about 500, preferably from about 15 to about 400, more preferably from about 20 to about 300, still more preferably from about 25 to about 200, and most preferably from about 30 to about 100 kpsi.

The Discrete Hardness Regions of the golf balls may each also have a specific gravity from about 0.95 to about 1.40, preferably from about 1.00 to about 1.35, more preferably from about 1.05 to about 1.30.

For a ball with more than one discrete hardness region in the SCR, the regions may be differentiated by describing their placement relative to the ball center by using the term inner intermediate, outer, inner intermediate, outer intermediate and the like or alternatively designed a numeric order with the lowest number being the region closer to the ball center and so on.

Thus for example for a ball with two discrete hardness regions in the SCR, the one closer to the core is defined herein as the Inner Discrete Hardness Region or Discrete Hardness Region 1 ("$DHR_1$") and the one further from the core is defined as the Outer Discrete Hardness Region or Discrete Hardness Region 2 ("$DHR_2$"). For a ball with three discrete hardness regions in the SCR, the one closer to the core is defined herein as the Inner Discrete Hardness Region or Discrete Hardness Region 1 ("$DHR_1$") and the one further from the core is defined as the Outer Discrete Hardness Region or Discrete Hardness Region 3 ("$DHR_3$") and the one between as the Intermediate Discrete Hardness Region or Discrete Hardness Region 2 ("$DHR_2$"). For a ball with more than three intermediate discrete hardness regions it is recommended to maintain the numeric designations or alternatively they can similarly be distinguished as the inner and outer intermediate discrete hardness regions depending on their position relative to the center of the golf ball. For the avoidance of doubt, in the case of a golf ball core, the center of which is included in the SCR, this would include the Inner Discrete Hardness Region.

Referring specifically to FIG. 1, the term "Single Region Ball" as used herein, 100, is a ball in which the SCR, hatched region 106, spans the distance from the geometric center of the golf ball, 102 to the outer ball surface 104. The ball has from 1 to 10, preferably from 2 to 8, more preferably from 2 to 5, even more preferably from 2 to 4 and most preferably from 2 to 3 discrete hardness regions within the SCR. Thus further by way of example, if the SCR spans the distance from the geometric center of the golf ball, 102 to the outer ball surface 104 and also has a single discrete hardness region in the SCR, it is called a "Single Region Ball", if the ball had three discrete hardness regions in the SCR it would be called a "Triple Region Ball".

Figure 2:
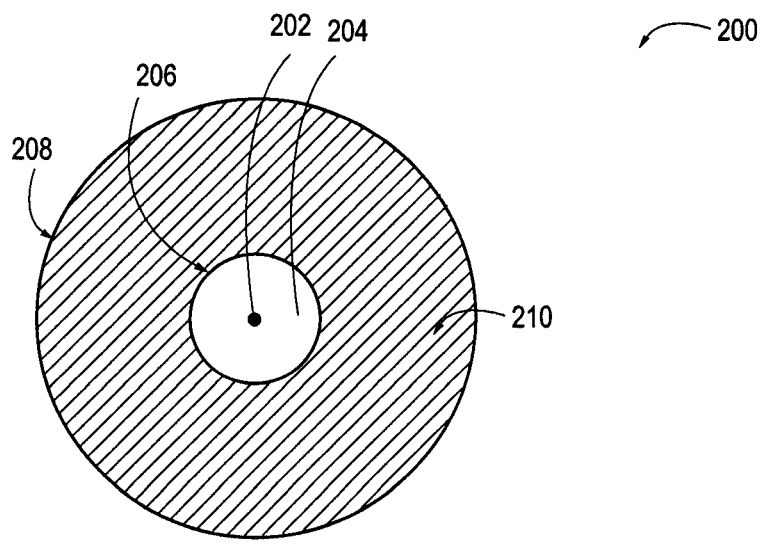
FIG. 2 shows a Cored Single Region Ball of the present invention where the Single Component Region is the region from the outer surface of the core to the outer ball surface.

Referring specifically to FIG. 2, the term "Cored Single Region Ball" as used herein, 200, is a ball in which the SCR, hatched region 210, spans the distance from the core outer surface, 206 to the outer ball surface 208, and thus excludes both the geometric center of the golf ball, 202, and the golf ball core 204. The ball has from 1 to 10, preferably from 2 to 8, more preferably from 2 to 5, even more preferably from 2 to 4 and most preferably from 2 to 3 discrete hardness regions. Thus by way of example, if the SCR excludes both the geometric center of the golf ball, 202, and the golf ball core 204 and also has a single discrete hardness region in the SCR it is called a "Cored Single Region Ball", if the ball excludes both the geometric center of the golf ball, 202, and the golf ball core 204 in the SCR and also had three discrete hardness regions in the SCR it would be called a "Cored Triple Region Ball".

Figure 3:
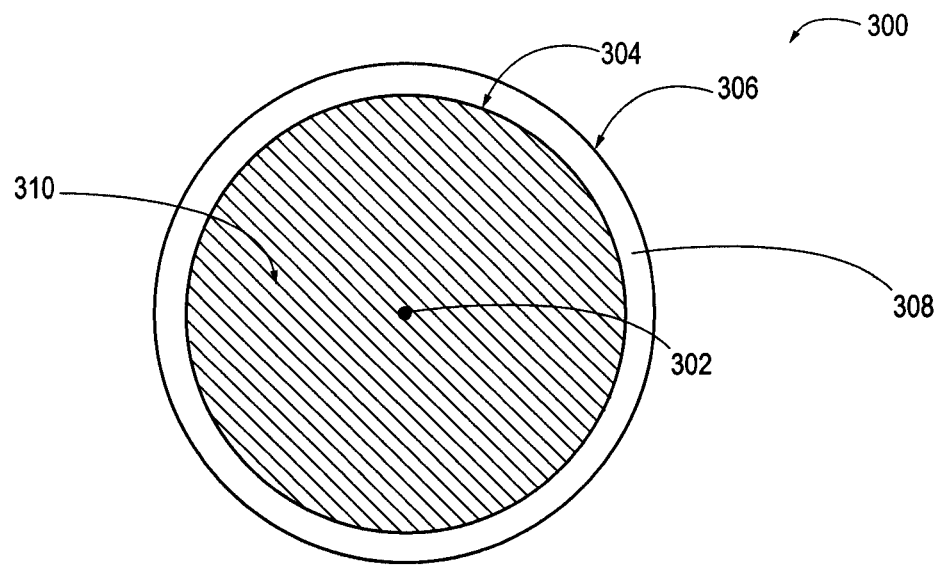
FIG. 3 shows a Single Mantle golf ball of the present invention where the Single Component Region is the region from the geometric center of the golf ball to the inner surface of the outer cover layer.

Referring specifically to FIG. 3, the term "Single Mantle Ball" as used herein, 300, is a ball having an outer cover layer 308, the outer cover layer having an inner surface, 304, and an outer surface, 306, and in which the SCR, hatched region 310, excludes the golf ball outer cover layer 308, and spans the distance from the geometric center of the golf ball, 302 to the inner surface of the outer cover layer 304. The ball has from 1 to 10, preferably from 2 to 8, more preferably from 2 to 5, even more preferably from 2 to 4 and most preferably from 2 to 3 discrete hardness regions. Thus, by way of example if such a ball excludes the outer cover layer 308 in the SCR and has a single discrete hardness region in the SCR it would be called a "Single Mantle Ball", if such a ball excludes the outer cover layer 308 from the SCR but has three discrete hardness regions in the SCR, it would be called a "Triple Mantle Ball".

Figure 4:
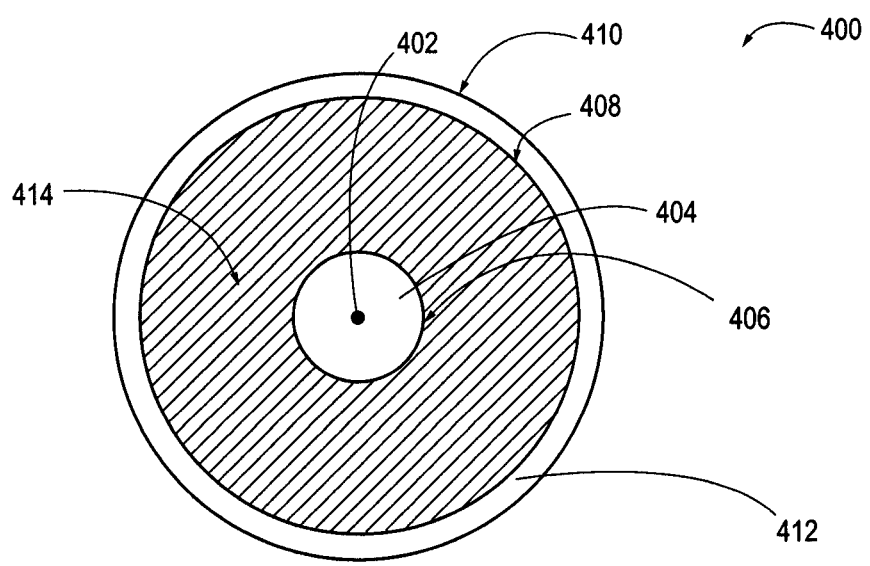
FIG. 4 shows a Cored Single Mantle Ball of the present invention where the Single Component Region is the region from the outer surface of the core to the inner surface of the outer cover layer.

Referring specifically to FIG. 4, the term "Cored Single Mantle Ball" as used herein, 400, is a ball in which the SCR, hatched region 414 excludes the golf ball core 404 and outer cover layer 412, the outer cover layer having an inner surface, 408, and an outer surface, 410, and thus the SCR 414 spans the distance from the golf ball core outer surface 406 to the inner surface of the outer cover layer 408. The ball may have has from 1 to 10, preferably from 2 to 8, more preferably from 2 to 5, even more preferably from 2 to 4 and most preferably from 2 to 3 discrete hardness regions. Thus, by way of example if such a ball excludes the golf ball core 404 and outer cover layer 412 in the SCR and has a single discrete hardness region in the SCR it would be called a "Cored Single Mantle Ball", if such a ball excludes the golf ball core 404 and outer cover layer 412 in the SCR but has three discrete hardness regions in the SCR, it would be called a "Cored Triple Mantle Ball".

Figure 5:
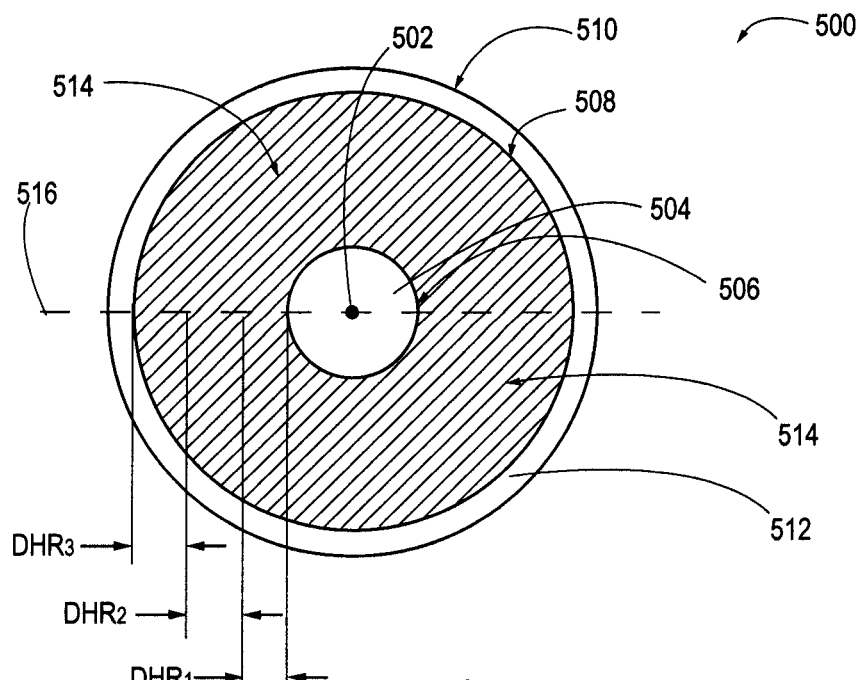
FIG. 5 shows a Cored Triple Mantle Ball of the present invention where the Single Component Region is the region from the outer surface of the core to the inner surface of the outer cover layer and within the Single Component Region there are three Discrete Hardness Regions, $DHR_1$, $DHR_2$ and $DHR_3$.

Referring specifically to FIG. 5, the Cored Triple Mantle Ball 500 has an SCR hatched region 514 which excludes the golf ball core 504 and outer cover layer 512, the outer cover layer having an inner surface, 508, and an outer surface, 510, and thus the SCR 514 spans the distance from the golf ball core outer surface 506 to the inner surface of the outer cover layer 508. The ball also has three discrete hardness regions in the SCR, the one closer to the core is defined herein as the Inner Discrete Hardness Region or Discrete Hardness Region 1 ("DHR$_1$") and the one further from the core is defined as the Outer Discrete Hardness Region or Discrete Hardness Region 3 ("DHR$_3$") and the one between as the Intermediate Discrete Hardness Region or Discrete Hardness Region 2 ("DHR$_2$"), all distances defined as in the lateral plane 516.

Figure 6:
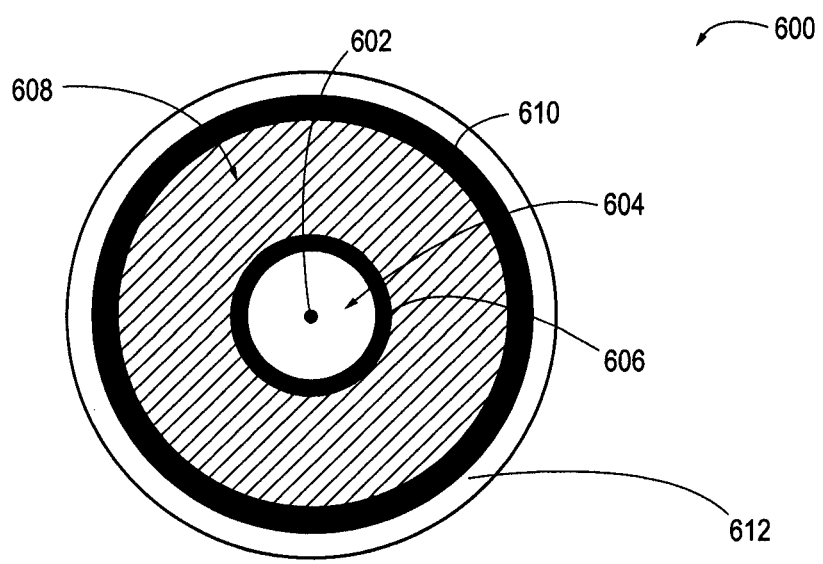
FIG. 6 shows a Cored Single Mantle Ball of the present invention having optional inner and outer intermediate layers.

Referring specifically to FIG. 6, this illustrates potential placements of additional optional intermediate layers in the golf balls of the present invention. The Cored Single Mantle Ball 600 has an SCR hatched region 608 which excludes the golf ball core 604 and outer cover layer 612. Also excluded from the SCR are two additional intermediate layers, an outer intermediate layer 610 disposed between the SCR hatched region 608 and outer cover layer 612, and a second inner intermediate layer 606 disposed between the SCR hatched region 608 and the golf ball core 604.

The singular terms "a," "an," and "the" include plural referents unless context clearly indicates otherwise. The word "comprises" indicates "includes." It is further to be understood that all molecular weight or molecular mass values given for compounds are approximate, and are provided for description. The materials, methods, and examples are illustrative only and not intended to be limiting. Unless otherwise indicated, description of components in chemical nomenclature refers to the components at the time of addition to any combination specified in the description, but does not necessarily preclude chemical interactions among the components of a mixture once mixed.

The term "mantle" as used herein is intended to describe the Single Component Region golf ball disposed between the geometric center of the ball and the inner surface of the outer cover layer.

The term "intermediate layer" as used herein refers to a layer excluded from the SCR and is thus is distinct from the mantle. The golf balls of the present invention may have one or more additional layers excluded from the SCR and which are interposed either between the golf ball core outer surface and the SCR, and therefore designated as inner intermediate layer(s) or between the outer surface of the SCR and the inner surface of the outer cover layer and therefore designated as inner intermediate layer(s).

The presently disclosed compositions can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.670 inches to about 1.800 inches or about 1.680 inches to about 1.800 inches. The more preferred diameter is from about 1.680 inches to about 1.760 inches. A diameter of from about 1.680 inches to about 1.740 inches is most preferred; however diameters anywhere in the range of from 1.70 to about 2.0 inches can be used. Oversize golf balls with diameters above about 1.760 inches to as big as 2.75 inches are also within the scope of the disclosure.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc., are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The above term descriptions are provided solely to aid the reader, and should not be construed to have a scope less than that understood by a person of ordinary skill in the art or as limiting the scope of the appended claims.

In the golf balls of the present invention the SCR is composed of an injection moldable synthetic rubber. One injection moldable synthetic rubber for use in the SCR of the golf balls of the present invention are the polyalkenamer rubbers which may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference. Examples of suitable polyalkenamer rubbers are polybutenamer rubber, polypentenamer rubber, polyhexenamer rubber, polyheptenamer rubber, polyoctenamer rubber, polynonenamer rubber, polydecenamer rubber polyundecenamer rubber, polydodecenamer rubber, polytridecenamer rubber. For further details concerning polyalkenamer rubber, see Rubber Chem. & Tech., Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubbers used in the present disclosure exhibit excellent melt processability above their sharp melting temperatures and exhibit high miscibility with various rubber additives as a major component without deterioration of crystallinity which in turn facilitates injection molding. Thus, unlike synthetic polybutadiene rubbers typically used in golf ball core preparation, injection molded parts of polyalkenamer-based compounds can be prepared which, in addition, can also be partially or fully crosslinked at elevated temperature. The crosslinked polyalkenamer compounds are highly elastic, and their mechanical and physical properties can be easily modified by adjusting the formulation.

The polyalkenamer composition surprisingly exhibits superior characteristics over a broad spectrum of properties that relate to the effectiveness of a composition for use in the SCR of the golf balls of the present invention. For example, the composition exhibits superior impact durability and Coefficient of Restitution (COR) in a pre-determined hardness range (e.g., a hardness Shore D of from about 15 to about 85, preferably from about 40 to about 80, and more preferably from about 40 to about 75. More particularly, the compositions disclosed herein exhibit excellent hardness adjustment without significantly compromising COR or processability.

The polyalkenamer rubbers may also be blended within other polymers and an especially preferred blend is that of a polyalkenamer and a polyamide. A more complete description of the polyalkenamer rubbers are disclosed in U.S. Pat. No. 7,528,196 and copending U.S. application Ser. No. 12/415,522, filed on Mar. 31, 2009, both in the name of Hyun Kim et al., the entire contents of both of which are hereby incorporated by reference.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer has a trans content of approximately 80%, however, compounds having other ratios of the cis- and trans-isomeric forms of the polyalkenamer can also be obtained by blending available products for use in making the composition.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5 to about 70, preferably from about 6 to about 50, more preferably from about from 6.5 to about 50%, even more preferably from about from 7 to about 45%, More preferably, the polyalkenamer rubber is a polymer prepared by polymerization of cyclooctene to form a trans-polyoctenamer rubber as a mixture of linear and cyclic macromolecules.

Prior to its use in golf balls, the polyalkenamer rubber or other synthetic rubber compositions used in the present invention may be further formulated with one or more of the following blend components:

A. Crosslinking Agents

The synthetic rubber compositions used in the present invention may include any crosslinking or curing system typically used for rubber crosslinking Satisfactory crosslinking systems may include those based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable crosslinking agents include peroxides, sulfur compounds, as well as mixtures of these. Non-limiting examples of suitable crosslinking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as crosslinking agents in the disclosed compositions can be brought about by applying thermal energy, shear, irradiation, reaction with other chemicals, or any combination of these. Both homolytically and heterolytically decomposed peroxide can be used. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl) peroxide.

The crosslinking agents can be blended in total amounts of about 0.1 part to about 10, more preferably about 0.4 to about 6, and most preferably about 0.8 part to about 4 parts per 100 parts of the synthetic rubber compositions used in the present invention. The crosslinking agent(s) may be mixed directly into or with the synthetic rubber compositions, or the crosslinking agent(s) may be pre-mixed with the synthetic rubber component to form a concentrated compound prior to subsequent compounding with the bulk of the synthetic rubber compositions used in the present invention.

Each peroxide crosslinking agent has a characteristic decomposition temperature at which 50% of the crosslinking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more crosslinking agents having different characteristic decomposition temperatures at the same $t_{1/2}$ may be blended in the composition. For example, where at least one crosslinking agent has a first characteristic decomposition temperature less than 150° C., and at least one crosslinking agent has a second characteristic decomposition temperature greater than 150° C., the composition weight ratio of the at least one crosslinking agent having the first characteristic decomposition temperature to the at least one crosslinking agent having the second characteristic decomposition temperature can range from 5:95 to 95:5, or more preferably from 10:90 to 50:50.

Besides the use of chemical crosslinking agents, exposure of the synthetic rubber compositions used in the present invention to radiation also can serve as a crosslinking agent. Radiation can be applied to the synthetic rubber compositions by any known method, including using microwave or gamma radiation, or an electron beam device. Additives may also be used to improve radiation-induced crosslinking of the synthetic rubber composition.

B. Co-Crosslinking Agent

The synthetic rubber compositions used in the present invention may also be blended with a co-crosslinking agent, which may be an unsaturated carboxylic acid, or a metal salt thereof. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in the synthetic rubber compositions either as a preformed metal salt, or by introducing an α,β-unsaturated carboxylic acid and a metal oxide or hydroxide into the synthetic rubber composition, and allowing them to react to form the metal salt. The unsaturated carboxylic acid metal salt can be blended in any desired amount, but preferably in amounts of about 5 to about 160, more preferably from about 10 to about 150, most preferably from about 20 to about 140 parts per 100 parts of the synthetic rubber composition.

C. Peptizer

The synthetic rubber compositions used in the present invention may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4'dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1S$—$SR_2$), etc.; and combinations of functional groups. Such peptizers are more fully disclosed in copending U.S. Application No. 60/752,475 filed on Dec. 20, 2005 in the name of Hyun Kim et al, the entire contents of which are herein incorporated by reference. A most preferred example is 2,3,5,6-tetrachloro-4-pyridinethiol (TCPT).

The peptizer, if employed in the synthetic rubber formulations used to prepare the golf balls of the present invention, is present in an amount up to about 10, from about 0.1 to about 10, preferably of from about 0.5 to about 8, more preferably of from about 1 to about 6 parts by weight per 100 parts by weight of the synthetic rubber component.

D. Accelerators

The synthetic rubber compositions used in the present invention can also comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The synthetic rubber composition can further incorporate from about 0.1 part to about 10 parts by weight of the accelerator per 100 parts by weight of the synthetic rubber. More preferably, the ball composition can further incorporate from about 0.5 part to about 8 parts, and most preferably from about 1 part to about 6 parts, by weight of the accelerator per 100 parts by weight of the synthetic rubber.

Additional Polymer Components

The golf balls of the present invention may comprise one or more of the following additional polymers generally considered useful for making golf balls as either an additional blend component or as one or more of the components of the golf balls of the present invention including the golf ball outer cover layer and intermediate layers. These polymers include, without limitation, synthetic and natural rubbers, thermoset polymers such as other thermoset polyurethanes or thermoset polyureas, as well as thermoplastic polymers including thermoplastic elastomers such as thermoplastic polyurethanes or thermoplastic polyureas, metallocene catalyzed polymers, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, polyamides, copolyamides, polyesters, copolyesters, polycarbonates, polyolefins, halogenated polyolefins, such as halogenated polyethylene [e.g. chlorinated polyethylene (CPE)], halogenated polyalkylene compounds, polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic block copolymers including styrene-butadiene-styrene (SBS), styrene-ethylene-butylene-styrene, (SEBS) and styrene-ethylene-propylene-styrene (SEPS), styrenic terpolymers, functionalized styrenic block copolymers including hydroxylated, functionalized styrenic copolymers, and terpolymers, cellulosic polymers, liquid crystal polymers (LCP), ethylene-propylene-diene terpolymers (EPDM), ethylene-vinyl acetate copolymers (EVA), ethylene-propylene copolymers, propylene elastomers (such as those described in U.S. Pat. No. 6,525,157, to Kim et al, the entire contents of which is hereby incorporated by reference in its entirety), ethylene vinyl acetates and polysiloxanes, and any and all combinations thereof.

One preferred material which may be used as a component of the outer cover layer and/or intermediate layers of the golf balls of the present invention comprises a blend of an ionomer and a block copolymer. Examples of such block copolymers include styrenic block copolymers including styrene-butadiene-styrene (SBS), styrene-ethylene-butylene-styrene, (SEBS) and styrene-ethylene/propylene-styrene (SITS). Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product, and in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred functionalized styrenic block copolymer is SEPTON HG-252. Such blends are described in more detail in commonly-assigned U.S. Pat. No. 6,861,474 and U.S. Patent Publication No. 2003/0224871 both of which are incorporated herein by reference in their entireties.

Another preferred material for the outer cover and/or intermediate layers of the golf balls of the present invention is a composition prepared by blending together at least three materials, identified as Components A, B, and C, and melt-processing these components to form in-situ, a polymer blend composition incorporating a pseudo-crosslinked polymer network. Such blends are described in more detail in commonly-assigned U.S. Pat. No. 6,930,150, to Kim et al, the content of which is incorporated by reference herein in its entirety. Component A is a monomer, oligomer, prepolymer or polymer that incorporates at least five percent by weight of at least one type of an acidic functional group. Examples of such polymers suitable for use as include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the Escor® 5000, 5001, 5020, 5050, 5070, 5100, 5110 and 5200 series of ethylene-acrylic acid copolymers sold by Exxon and the PRI-MACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-acrylic acid copolymers Nucrel 599, 699, 0903, 0910, 925, 960, 2806, and 2906 ethylene-methacrylic acid copolymers. sold by DuPont Also included are the bimodal ethylene/carboxylic acid polymers as described in U.S. Pat. No. 6,562,906, the contents of which are incorporated herein by reference. These polymers comprise ethylene/$\alpha,\beta$-ethylenically unsaturated $C_{3-8}$ carboxylic acid high copolymers, particularly ethylene (meth) acrylic acid copolymers and ethylene, alkyl (meth)acrylate, (meth)acrylic acid terpolymers, having molecular weights of about 80,000 to about 500,000 which are melt blended with ethylene/$\alpha,\beta$-ethylenically unsaturated $C_{3-8}$ carboxylic acid copolymers, particularly ethylene/(meth)acrylic acid copolymers having molecular weights of about 2,000 to about 30,000.

Component B can be any monomer, oligomer, or polymer, preferably having a lower weight percentage of anionic functional groups than that present in Component A in the weight ranges discussed above, and most preferably free of such functional groups. Examples of materials for use as Component B include block copolymers such as styrenic block copolymers including styrene-butadiene-styrene (SBS), styrene-ethylene-butylene-styrene, (SEBS) and styrene-ethylene/propylene-styrene (SEPS). Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. Commercial examples SEPTON marketed by Kuraray Company of Kurashiki, Japan; TOPRENE by Kumho Petrochemical Co., Ltd and KRATON marketed by Kraton Polymers.

Component C is a base capable of neutralizing the acidic functional group of Component A and is a base having a metal cation. These metals are from groups IA, IB, IIA, IIB, IIIA, IIIB, IVA, IVB, VA, VB, VIIA, VIIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, or metal acetates.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

Another preferred material for the outer cover and/or one or intermediate layers of the golf balls of the present invention is a blend of a homopolyamide or copolyamide modified and a polymer including a grafted maleic anhydride group.

Another preferred material which may be used as a component of the outer cover layer and/or intermediate layer of the golf balls of the present invention is the family of polyurethanes or polyureas which are typically are prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer.

In addition to discrete thermoplastic or thermoset materials, it also is possible to modify thermoplastic polyurethane or polyurea compositions by introducing materials in the composition that undergo subsequent curing after molding the thermoplastic to provide properties similar to those of a thermoset. For example, Kim in U.S. Pat. No. 6,924,337, the entire contents of which are hereby incorporated by reference, discloses a thermoplastic urethane or urea composition optionally comprising chain extenders and further comprising a peroxide or peroxide mixture, which can then undergo post curing to result in a thermoset.

Also, Kim et al. in U.S. Pat. No. 6,939,924, the entire contents of which are hereby incorporated by reference, discloses a thermoplastic urethane or urea composition, optionally also comprising chain extenders, that are prepared from a diisocyanate and a modified or blocked diisocyanate which unblocks and induces further cross linking post extrusion. The modified isocyanate preferably is selected from the group consisting of: isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethylpyrazole modified isocyanate; or mixtures of these.

Finally, Kim et al. in U.S. Pat. No. 7,037,985 B2, the entire contents of which are hereby incorporated by reference, discloses thermoplastic urethane or urea compositions further comprising a reaction product of a nitroso compound and a diisocyanate or a polyisocyanate. The nitroso reaction product has a characteristic temperature at which it decomposes to regenerate the nitroso compound and diisocyanate or polyisocyanate. Thus, by judicious choice of the post-processing temperature, further crosslinking can be induced in the originally thermoplastic composition to provide thermoset-like properties.

Any isocyanate available to one of ordinary skill in the art is suitable for use in the polyurethanes or polyureas used in the present invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=N—R—N=C=O, where R preferably is a cyclic, aromatic, or linear or branched hydrocarbon moiety containing from about 1 to about 50 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}MDI$); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Any polyol now known or hereafter developed is suitable for use according to the invention. Polyols suitable for use in the present invention include, but are not limited to, polyester polyols, polyether polyols, polycarbonate polyols and polydiene polyols such as polybutadiene polyols.

Any polyamine available to one of ordinary skill in the polyurethane art is suitable for use according to the invention. Polyamines suitable for use in the compositions of the present invention include, but are not limited to, amine-terminated compounds typically are selected from amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof.

The diisocyanate and polyol or polyamine components may be combined to form a prepolymer prior to reaction with a chain extender or curing agent. Any such prepolymer combination is suitable for use in the present invention.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent, and even more preferably from about 3 percent to about 9 percent, free NCO on an equivalent weight basis.

Polyol chain extenders or curing agents may be primary, secondary, or tertiary polyols. Non-limiting examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines and other suitable polyamines may be added to the compositions of the present invention to function as chain extenders or curing agents. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4"-methylenebis-(3-chloro, 2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diamino-phenyl methane, p,p'-methylenedianiline, p-phenylenediamine or 4,4'-diaminodiphenyl; and 2,4,6-tris(dimethylaminomethyl) phenol.

Depending on their chemical structure, curing agents may be slow- or fast-reacting polyamines or polyols. As described in U.S. Pat. Nos. 6,793,864, 6,719,646 and copending U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity speed of the polyamines.

Suitable curatives for use in the present invention are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

Also included as a curing agent for use in the polyurethane or polyurea compositions used in the present invention are the family of dicyandiamides as described in copending application Ser. No. 11/809,432 filed on May 31, 2007 by Kim et al., the entire contents of which are hereby incorporated by reference The outer cover layer and/or intermediate layers of the golf balls of the present invention may also comprise one or more ionomer resins. One family of such resins were developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a metal selected from the group consisting of zinc, sodium, lithium, calcium, magnesium, and combinations thereof.

E/X/Y, where E is ethylene, X is a softening comonomer such as present in an amount of from 0 wt. % to about 50 wt. % of the polymer, and Y is present in an amount from about 5 wt. % to about 35 wt. % of the polymer, and wherein the acid moiety is neutralized from about 1% to about 90% to form an ionomer with a cation such as lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having a weight average molecular weight, Mw, of about 80,000 to about 500,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and b) a low molecular weight component having a weight average molecular weight, Mw, of about from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers may be prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, zinc, calcium, magnesium, and a mixture of any of these; and b) from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;

a) a high molecular weight component having a weight average molecular weight, Mw, of about 80,000 to about 500,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, potassium, magnesium, and a mixture of any of these; and b) a low molecular weight component having a weight average molecular weight, Mw, of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, potassium, magnesium, and a mixture of any of these; and c) from about 5 to about 40 weight percent (based on the total weight of said modified ionomeric polymer) of one or more fatty acids or metal salts of said fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_X COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$) and lauric acid ($C_{12}$, i.e., $CH_3(CH_2)_{10}OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3(CH_2)_7 CH:CH(CH_2)_7 COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I DuPont de Nemours and Co. Inc.

Fillers

The various polymeric compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred aspect the filler comprises a continuous or non-continuous fiber. In another preferred aspect the filler comprises one or more so called nanofillers, as described in U.S. Pat. No. 6,794,447 and copending U.S. patent application Ser. No. 10/670,090 filed on Sep. 24, 2003 and copending U.S. patent application Ser. No. 10/926,509 filed on Aug. 25, 2004, the entire contents of each of which are incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

Nanofillers when added into a matrix polymer, such as the polyalkenamer rubber, can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a 3% to 5% clay loading and has a tensile strength of 11,800 psi and a specific gravity of 1.14, while a conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating up to about 20%, or from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

The nanofiller material is added in an amount up to about 20 wt %, from about 0.1% to about 20%, preferably from about 0.1% to about 15%, and most preferably from about 0.1% to about 10% by weight (based on the final weight of the polymer matrix material) of nanofiller reacted into and substantially dispersed through intercalation or exfoliation into the structure of the polymer matrix.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls.

Another particularly well-suited additive for use in the various polymer compositions used to prepare the golf balls of the present invention includes compounds having the general formula:

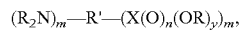

$(R_2N)_m-R'-(X(O)_n(OR)_y)_m$, where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=0 or 1 and y=2 or 4. Also, m=1-3. These materials are more fully described in copending U.S. patent application Ser. No. 11/182,170, filed on Jul. 14, 2005, the entire contents of which are incorporated herein by reference.

Preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoicacid, 12-amindododecanoic acid, epsilon-caprolactam; omega-caprolactam, and any and all combinations thereof.

In an especially preferred aspect, a nanofiller additive component in the golf ball of the present invention is surface modified with a compatibilizing agent comprising the earlier described compounds having the general formula:

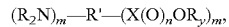

$(R_2N)_m-R'-(X(O)_nOR_y)_m$,

A most preferred aspect would be a filler comprising a nanofiller clay material surface modified with an amino acid including 12-aminododecanoic acid. Such fillers are available from Nanonocor Co. under the tradename Nanomer 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

The polymer compositions used as a component of the golf balls of the present invention may also be further modified by addition of a monomeric aliphatic and/or aromatic amide as described in copending application Ser. No. 11/592,109 filed on Nov. 1, 2006 in the name of Hyun Kim et al., the entire contents of which are hereby incorporated by reference.

Golf balls within the scope of the present invention also can include, in suitable amounts, one or more additional ingredients generally employed in golf ball compositions. Agents provided to achieve specific functions, such as additives and stabilizers, can be present. Examplary suitable ingredients include colorants, antioxidants, colorants, dispersants, mold releasing agents, processing aids, fillers, and any and all combinations thereof. Although not required, UV stabilizers, or photo stabilizers such as substituted hydroxphenyl benzotriazoles may be utilized in the present invention to enhance the UV stability of the final compositions. An example of a commercially available UV stabilizer is the stabilizer sold by Ciba Geigy Corporation under the tradename TINUVIN.

Golf Ball Composition and Construction

As described above, the Single or Multiple Region or Single Mantle or Multiple Mantle Balls of the present invention have an SCR which includes the geometric center of the golf ball and do not have a discrete and separate core. The Cored Single or Cored Multiple Region or Cored Single Mantle or Cored Multiple Mantle Balls of the present invention do include a separate and discrete golf ball core. In one embodiment the core of the golf balls of the present invention, when present, may comprise multiple core layers. The core and any core layers may be made from material commonly used to prepare golf ball cores including, but not limited to, cis 1,4-polybutadiene rubber, syn 1,2-polybutadiene rubber, polyalkenamer rubber, ionomers, thermoplastic and thermoset polyurethanes and polyureas. A preferred material is cis 1,4-polybutadiene. The various core layers (including the central core) may each exhibit a different hardness. The difference between the center hardness and that of the next adjacent layer, as well as the difference in hardness between the various core layers may be greater than 2, preferably greater than 5, most preferably greater than 10 units of Shore D. In one preferred embodiment, the hardness of the center and each sequential layer increases progressively outwards from the center to outer core layer. In another preferred embodiment, the hardness of the center and each sequential layer decreases progressively inwards from the outer core layer to the center.

The core of the golf balls of the present invention, if present, may have a diameter of from about 0.5 to about 1.62, preferably from about 0.7 to about 1.60, more preferably from about 1 to about 1.58, yet more preferably from about 1.15 to about 1.54, and most preferably from about 1.20 to about 1.50 in.

The core of the golf balls of the present invention, if present, also may have a PGA compression of from about 10 to about 200, preferably from about 20 to about 185, more preferably from about 30 to about 180, and most preferably from about 40 to about 120. In another embodiment, the core of the balls may have a PGA compression of from about 20 to about 100, preferably from about 25 to about 90, more preferably from about 30 to about 80.

Also as described above the Single Mantle or Multiple Mantle or Cored Single Mantle or Cored Multiple Mantle Balls of the present invention have a discrete and separate outer cover layer. The outer cover layer of the balls may have a thickness of about 0.01 to about 0.10, preferably from about 0.015 to about 0.08, more preferably from about 0.02 to about 0.06 in.

The outer cover layer the balls may have a hardness Shore D from about 40 to about 70, preferably from about 45 to about 70 or about 50 to about 70, more preferably from 47 to about 68 or about 45 to about 70, and most preferably from about 50 to about 65.

The Cored Single or Multiple Region Balls, the Single Mantle or Multiple Mantle or Cored Single Mantle or Cored Multiple Mantle Balls of the present invention may also have additional layers excluded from the SCR, but interposed between the golf ball core outer surface and the inner surface of the SCR and/or between the outer surface of the SCR and the inner surface of the outer cover layer. In either case these are designated as intermediate layers. The golf ball of the present invention may comprise from 0 to 5, preferably from 0 to 4, more preferably from 1 to 5, and most preferably from 1 to 4 such intermediate layer(s).

The COR of the golf balls of the present invention may be greater than about 0.760, preferably greater than about 0.780, more preferably greater than 0.790, most preferably greater than 0.795, and especially greater than 0.800 at 125 ft/sec inbound velocity. In another embodiment, the COR of the golf balls may be greater than about 0.760, preferably greater than about 0.780, more preferably greater than 0.790, most preferably greater than 0.795, and especially greater than 0.800 at 143 ft/sec inbound velocity.

Method of Making the Golf Balls

The initial polyalkenamer rubber compositions can be formed by any commonly used mixing methods. For instance, the polyalkenamer rubber composition, and crosslinking agents, fillers and the like can be mixed together with or without melting them. Dry blending equipment, such as a tumble mixer, V-blender, ribbon blender, or two-roll mill, can be used to mix the compositions. The polyalkenamer rubber compositions can also be mixed using a mill, internal mixer such as a Banbury or Farrel continuous mixer, extruder or combinations of these, with or without application of thermal energy to produce melting. The various components can be mixed together with the crosslinking agents, or each additive can be added in an appropriate sequence to the milled unsaturated polymer. In another method of manufacture the crosslinking agents and other components can be added to the unsaturated polymer as part of a concentrate using dry blending, roll milling, or melt mixing.

The compositions described herein can also be prepared by using a twin screw extruder with or without pre-mixing prior to charging to the extruder. The barrel temperature for the blending may be between about 140° C. to about 300° C., more preferably between about 160° C. to about 280° C., and most preferably between about 180° C. to about 260° C. The compounded material can be positioned readily around a golf ball core using injection molding. The barrel temperature for the injection molding may be between about 160° C. to about 280° C., more preferably between about 180° C. to about 260° C., and most preferably between about 200° C. and 260° C.

The ability of polyalkenamer rubber composition, to be injection molded and cured either subsequently by compression molding or actually during the injection molding process itself provides considerable flexibility in manufacture of the individual golf ball components.

Thus, golf balls comprising a Single Component Region may be prepared by injection molding an initial layer of the polyalkenamer composition of the required dimensions and crossslinking package, and subsequently injection molding additional layers of the polyalkenamer composition having a different crosslinking packages. When the required amount of layers has been formed, the resulting structure may then be co-cured to form the Single Component Region of crosslinked polyalkenamer composition, within which region are discrete hardness regions of varying hardness and/or specific gravity. The varying hardness and/or specific gravity may be obtained by employing different crosslinking packages and/or by employing different processing conditions.

Golf balls comprising a Single Component Region may also be prepared by initially injection molding the required number of half shells of a polyalkenamer composition of the required dimensions and crossslinking package and subsequently injection molding additional half shells of the polyalkenamer composition having a different crosslinking package. When the required number of half shells have been formed, the half shells are then stacked together and the resulting structure is then co-cured to form a single component region of crosslinked polyalkenamer composition, within which region are discrete hardness regions of varying hardness and/or specific gravity.

In the case of golf balls having a separate and discrete core (and optionally additional core layers and intermediate layers), they may be prepared by initially positioning a solid preformed core in an injection-molding cavity followed by uniform injection of the polyalkenamer rubber composition, sequentially over the core, to produce layers of the required thickness and ultimately golf balls of the required diameter. Again use of a heated injection mold allows the temperature to be controlled sufficient to either partially of fully crosslink the material to yield the desired layer properties. If the material is partially cured, additional compression molding or irradiation steps may optionally be employed to complete the curing process to yield the desired SCR properties.

Alternatively, the SCR may also be formed around the core or intermediate layer by first forming half shells by injection molding the polyalkenamer rubber composition, followed by a compression molding the half shells about the core or intermediate layer to effect the curing of the layers in the final ball.

Alternatively, the SCR may also be formed around the core or intermediate layer by first forming half shells by injection molding the polyalkenamer rubber composition, again using a heated injection mold which allows the temperature to be controlled sufficient to either partially of fully crosslink the material to yield the desired half shell properties layer properties. The resulting fully or partially cured half shells may then be compression molded around the core or core plus intermediate layer. Again, if the half shell is partially cured, the additional compression molding or irradiation steps may optionally be tailored to complete the curing process to yield the desired SCR properties.

In addition, if radiation is used as a crosslinking agent, then the mixture comprising the unsaturated polymer and other additives can be irradiated following mixing, during forming into a part such as the core, intermediate layer, or outer cover of a ball, or after forming such part.

In addition, the present disclosure also relates to a method of preparation resulting from the combination of injection molding layers and half shells as described above.

Finally, the outer cover and any additional intermediate layers (if any) may also be formed using conventional molding techniques common used in golf ball preparation including but not limited to injection molding, casting and compression molding.

EXAMPLES

The Examples are given below by way of illustration and not by way of limitation. The materials employed in were as follows:

VESTENAMER 8012 is a trademark of and commercially available from Huls AG of Marl, Germany, and through its distributor in the U.S., Creanova Inc. of Somerset, N.J., and is a trans-polyoctenamer having a trans-content of approximately 80% with a melting point of approximately 54° C.

Surlyn® 8150 is a grade of ionomer commercially available from DuPont, and is a sodium ionomer of an ethylene/methacrylic acid polymer.

Surlyn® 9150 is a grade of ionomer commercially available from DuPont, and is a zinc ionomer of an ethylene/methacrylic acid polymer.

NdBR40 is a cis-1,4-polybutadiene rubber made with a rare earth catalyst and commercially available from Enichem.

ZnO is a rubber grade zinc oxide purchased from Akrochem (Akron, Ohio).

ZDA are zinc diacrylates was purchased commercially from Sartomer under the tradenames SR416, and SR638, or Jinyang Chemical, under the tradename ZDA12.

Tetrachlorothiopyridine was purchased commercially from Jinyang Chemical.

$BaSO_4$ is Poliwhite 200 barium sulfate purchased from Cinbar.

$NH_4PCTP$ is the ammonium salt of pentachlorothiophenol

Varox 231-XL is 1,1-di(t-butylperoxy)-3,3,5-trimethyl-cyclohexane crosslinkinginitiator, (**40% active peroxide). This is commercially available from R.T. Vanderbilt and is made by Atofina.

Trigonox 145 is 2,5-Dimethyl-2,5-di(tert-butylperoxy) hexyne crosslinkinginitiator, (**45% active peroxide). This is commercially available from Akzo Nobel. TAIC is triallyl isocyanurate, which is commercially available from Akrochem.

Nanomer 1.24TL is a surface treated clay nanofiller, commercially available from Nanonocor Co.

Color concentrate is $TiO_2$ with ionomer as binder.

The properties of Tensile Strength, Tensile Elongation, Flexural Strength, Flexural Modulus, PGA compression, C.O.R., Shore D hardness on both the materials and the resulting ball were conducted using the test methods as defined below.

Core or ball diameter was determined by using standard linear calipers or size gauge.

Specific gravity was determined by electronic densimeter using ASTM D-792.

Compression is measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

Initial velocity of a golf ball after impact with a golf club is governed by the United States Golf Association ("USGA"). The USGA requires that a regulation golf ball can have an initial velocity of no more than 250 feet per second±2% or 255 feet per second. The USGA initial velocity limit is related to the ultimate distance that a ball may travel (280 yards±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a perfectly or completely elastic collision and 0 being equivalent to a perfectly plastic or completely inelastic collision. Since a ball's COR directly influences the ball's initial velocity after club collision and travel distance, golf ball manufacturers are interested in this characteristic for designing and testing golf balls. One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Shore D material hardness was measured in accordance with ASTM Test D2240. Hardness of a layer was measured on the ball, and if on the outer surface, perpendicular to a land area between the dimples. Unless a material hardness is specified all hardnesses are measured on the ball.

The ball performance may be determined using a Robot Driver Test, which utilized a commercial swing robot in conjunction with an optical system to measure ball speed, launch angle, and backspin after a golf ball is hit with a titanium driver or standard 8 iron as applicable. In this test, club is attached to a swing robot and the swing speed and power profile as well as tee location and club lie angle is setup to generate the following values using the following set up conditions and reference balls:

175 mph: Titleist ProV1x, Ball Speed: 175 mph, Launch Angle: 12 deg, Backspin: 2600 rpm
160 mph: TaylorMade TP Red, Ball Speed: 160 mph, Launch Angle: 12 deg, Backspin: 2600 rpm
8 Iron: TaylorMade TP Red, Ball Speed: 110 mph, Launch Angle: 20 deg, Backspin: 7100 rpm Then, the test ball was substituted for the reference ball and the corresponding values for 175 mph Driver Spin and Driver Speed, 160 mph Driver Spin and Driver Speed and 8 Iron Spin determined.

Shear cut resistance was determined by examining the balls after they were impacted by a pitching wedge at controlled speed, classifying each numerically from 1 (excellent) to 5 (poor), and averaging the results for a given ball type. Three samples of each Example was used for this testing. Each ball was hit twice, to collect two impact data points per ball. Then, each ball was assigned two numerical scores—one for each impact—from 1 (no visible damage) to 5 (substantial material displaced). These scores were then averaged for each Example to produce the shear resistance numbers below. These numbers could then be directly compared with the corresponding number for a commercially available ball, the Taylor Made TP Black under the same test conditions, had a rating of 1.62.

Tensile Strength was measured in accordance with ASTM Test D 368.

Tensile Elongation was measured in accordance with ASTM Test D 368.

Flexural Modulus was measured in accordance with ASTM Test D 790.

Examples of the invention are given below by way of illustration and not by way of limitation.

Examples 1-6

Core Preparation—A series of unitary sold golf ball core was prepared by mixing NdBR40 polybutadiene, zinc oxide, SR638 zinc diacrylate, ammonium pentachlorothiophenol and Varox 231L peroxide, to produce a core having a Diameter of 1.48 in, a weight of 30.4 g, a PGA compression Of 49 and a COR of 0.809.

SCR Preparation

Inner Discrete Hardness Region ("$DHR_1$")—A composition comprising Vestenamer 8012, along with other ingredients was then injection molded over the polybutadiene rubber core. For Examples 1-3, a slightly lower amount of ZDA was used relative to Examples 4-6 as reflected in the difference in hardness of the Inner discrete hardness region of the two sets of examples.

Outer Discrete Hardness Region ("$DHR_2$")—The golf balls were then completed by making half cups from a second composition comprising Vestenamer 8012, along with other ingredients as summarized in Table 1. The half cups were formed by injection molding to a size sufficient to surround the earlier formed core/inner discrete hardness region precursor. The ball construction was completed by placing the core/inner discrete hardness region precursor surrounded by the half cups in a in compression mold with the required dimple pattern at 180° C. for 12 min to crosslink and form the SCR and the dimpled surface of the ball.

The data in Table 1 demonstrate that for Examples 1-6 it is possible to prepare a Cored Double Region Ball across a range of hardnesses on the Discrete Hardness Regions, all of which demonstrated excellent shear performance and thus little delamination as well as high ball speed as shown by COR values in excess of 0.8 at 125 ft/s.

TABLE 1

Cored Double Region Balls (SCR Spans Outer Core to Outer Ball Surface)

| | Ex 1 | Ex 2 | Ex 3 | Ex 4 | Ex 5 | Ex 6 |
|---|---|---|---|---|---|---|
| Core Physicals | | | | | | |
| Diameter* (in) | | | 1.48 | | | |
| Weight (grams) | | | 30.4 | | | |
| Compression (PGA) | | | 49 | | | |
| C.O.R. (125 ft/s) | | | 0.809 | | | |
| Inner Discrete Hardness Region ("DHR$_1$") | | | | | | |
| Vestenamer 8012 | | 100 | | | 100 | |
| ZnO | | 5 | | | 5 | |
| ZDA (SR416) | | 80 | | | 100 | |
| Varox 231XL | | 0.5 | | | 0.5 | |
| Trigonox 145 | | 0.14 | | | 0.14 | |
| Diameter* (in) | 1.616 | 1.616 | 1.616 | 1.616 | 1.616 | 1.616 |
| Thickness (in) | 0.0068 | 0.0068 | 0.0068 | 0.067 | 0.067 | 0.067 |
| Weight (grams) | 40.707 | 40.707 | 40.707 | 40.872 | 40.872 | 40.872 |
| Compression | 76 | 76 | 76 | 82 | 82 | 82 |
| COR (125 ft/s) | 0.819 | 0.819 | 0.819 | 0.823 | 0.823 | 0.823 |
| Hardness (Shore D) | 64.2 | 64.2 | 64.2 | 70.5 | 70.5 | 70.5 |
| Outer Discrete Hardness Region ("DHR$_2$") | | | | | | |
| Vestenamer 8012 | 100 | 100 | 100 | 100 | 100 | 100 |
| ZnO | 5 | 5 | 5 | 5 | 5 | 5 |
| ZDA (SR416) | 46 | 49 | 56 | 46 | 49 | 56 |
| Varox 231XL | 0.5 | 0.5 | 0.5 | 0.5 | 0.5 | 0.5 |
| Trigonox 145 | 0.14 | 0.14 | 0.14 | 0.14 | 0.14 | 0.14 |
| Diameter* (in) | 1.686 | 1.683 | 1.681 | 1.682 | 1.681 | 1.681 |
| Thickness (in) | 0.035 | 0.033 | 0.032 | 0.033 | 0.032 | 0.032 |
| Weight (grams) | 45.518 | 45.462 | 45.339 | 45.683 | 45.674 | 45.704 |
| Compression (PGA) | 74 | 76 | 73 | 77 | 79 | 82 |
| C.O.R. (at 125 ft/s) | 0.820 | 0.819 | 0.819 | 0.816 | 0.821 | 0.824 |
| Hardness (Shore D) | 53.3 | 55.9 | 58.8 | 55.8 | 60.0 | 61.9 |
| Shear Value | 1 | 1 | | | 1 | |

*Average of measurements at Pole and Equator.

Example 7

Core Preparation—A unitary sold golf ball core was prepared by mixing NdBR40 polybutadiene, zinc oxide, SR638 zinc diacrylate, ammonium pentachlorothiophenol and Varox 231L peroxide, to produce a core in the proportions and resulting in the properties as summarized in Table 2.

SCR Preparation

Inner Discrete Hardness Region—A composition comprising Vestenamer 8012, along with other ingredients was then injection molded over the polybutadiene rubber core, the proportions and resulting properties are summarized in Table 2.

Intermediate Discrete Hardness Region—A composition comprising Vestenamer 8012, along with other ingredients was then injection molded over the polybutadiene rubber core, the proportions and resulting properties are summarized in Table 2.

Outer Discrete Hardness Region—The golf ball covers were prepared by making half cups from a composition comprising Vestenamer 8012, along with other ingredients by injection molding half cups, in a size sufficient to surround the earlier formed core/inner/intermediate discrete hardness region precursor. The ball construction was completed by placing the core/inner discrete hardness region precursor surrounded by the half cups in a in compression mold with the required dimple pattern at 180° C. for 12 min to crosslink and complete the SCR and the dimpled surface of the ball. The proportions and resulting ball properties as summarized in Table 2.

The data in Table 2 demonstrate that it is possible to prepare a Cored Triple Region Ball having three Discrete Hardness Regions in the Single Component Region, the ball demonstrating excellent shear performance and thus little delamination as well as high ball speed as shown by COR values in excess of 0.8 at 125 ft/s.

TABLE 2

Cored Triple Region Ball (SCR Spans Outer Core to Outer Ball Surface)

| | Example 7 |
|---|---|
| Core Physicals | |
| Pole Size | 1.416 |
| Equator Size | 1.421 |
| Weight (grams) | 27.340 |
| Compression | 49 |
| C.O.R. (125 ft/s) | 0.810 |

TABLE 2-continued

Cored Triple Region Ball (SCR Spans Outer Core to Outer Ball Surface)

| | Example 7 |
|---|---|
| Inner Discrete Hardness Region ("DHR$_1$") | |
| Vestenamer 8012 | 100 |
| ZnO | 5 |
| ZDA (SR416) | 46 |
| Varox 231XL | 0.5 |
| Trigonox 145 | 0.14 |
| Diameter (in) | 1.52 |
| Hardness (Shore D) | 50D |
| Intermediate Discrete Hardness Region ("DHR$_2$") | |
| Vestenamer 8012 | 100 |
| ZnO | 5 |
| ZDA (SR416) | 80 |
| Varox 231XL | 0.5 |
| Trigonox 145 | 0.14 |
| Diameter (in) | 1.615 |
| Hardness (Shore D) | 65D |
| Outer Discrete Hardness Region (half shells) ("DHR$_3$") | |
| Vestenamer 8012 | 100 |
| ZnO | 5 |
| ZDA (SR416) | 44 |
| Varox 231XL | 0.5 |
| Trigonox 145 | 0.14 |
| Hardness (Shore D) | 47D |
| Ball Physicals | |
| Pole Size | 1.681 |
| Equator Size | 1.672 |
| Weight (grams) | 44.810 |
| Compression | 68 |
| C.O.R. (125 ft/s) | 0.809 |
| Hardness (Shore D) | 47.7 |
| Shear Value | 1 |

Examples 8 and 9

Core Preparation—A series of unitary sold golf ball cores were prepared by mixing NdBR40 polybutadiene, zinc oxide, ZDA12 zinc diacrylate, barium sulfate, pyridine tetrachlorothiophenol and Varox 231L peroxide, to produce a core in the proportions and resulting in the properties as summarized in Table 3.

SCR Preparation

Inner Discrete Hardness Region ("DHR$_1$")—A composition comprising Vestenamer 8012, along with other ingredients was then injection molded over the polybutadiene rubber core, the proportions and resulting properties are summarized in Table 3.

Outer Discrete Hardness Region ("DHR$_2$")—A composition comprising Vestenamer 8012, along with other ingredients was then injection molded over the polybutadiene rubber core, and then the resulting precursor was co-cured by placing it in a compression mold at 180° C. for 12 min to crosslink and complete the SCR and DHR's, the proportions and resulting properties are summarized in Table 3.

Outer Intermediate Layer—An intermediate layer of a 50/50 wt % blend of two ionomers, Surlyn 8150 and 9150, was then injection molded around the earlier formed core/inner/outer discrete hardness region precursor, the proportions and resulting properties are summarized in Table 3.

Outer Cover Layer—The ball construction was completed by casting a thermoset urethane cover around the around the earlier formed core/inner/outer discrete hardness region/outer intermediate layer precursor using a formulation based on a toluene diisocyante/PTMEG prepolymer cured with a diamine based curative mixture, the mold having the required dimple pattern. The proportions and resulting ball properties are summarized in Table 3.

TABLE 3

Cored Double Mantle Balls

| | Ex 8 | Ex 9 |
|---|---|---|
| Core Physicals | | |
| Size (in) | 1.260 | 1.260 |
| Compression (PGA) | 34 | 34 |
| Weight (g) | 21.7 | 21.7 |
| SpG | 1.170 | 1.177 |
| Inner Discrete Hardness Region ("DHR$_1$") | | |
| Vestenamer 8012 (pph) | 100 | 100 |
| ZnO (pph) | 5 | 5 |
| ZDA (SR416) (pph) | 50 | 50 |
| Varox 231XL | 0.5 | 0.5 |
| Trigonox 145 (pph) | 0.14 | 0.14 |
| Pole Size (in) | 1.380 | 1.380 |
| Compression (PGA) | 48 | 48 |
| Weight (g) | 26.29 | 26.29 |
| Shore D Hardness | 55 | 55 |
| Outer Discrete Hardness Region ("DHR$_2$") | | |
| Vestenamer 8012 (pph) | 100 | 100 |
| ZnO (pph) | 5 | 5 |
| ZDA (SR416) (pph) | 80 | 100 |
| Varox 231XL (pph) | 0.5 | 0.5 |
| Trigonox 145 (pph) | 0.14 | 0.14 |
| Pole Size (in) | 1.500 | 1.500 |
| Compression (PGA) | 58 | 59 |
| Weight (g) | 33.76 | 33.99 |
| Shore D Hardness | 57 | 60 |
| Outer Intermediate Layer | | |
| Surlyn 8150 (pph) | 50 | 50 |
| Surlyn 9150 (pph) | 50 | 50 |
| Pole Size (in) | 1.622 | 1.621 |
| Compression (PGA) | 83 | 87 |
| Weight (g) | 39.665 | 39.738 |
| Shore D Hardness | 67.8 | 67.1 |
| COR (at 125 ft/s) | 0.817 | 0.818 |
| Outer Cover Layer | | |
| Cast Urethane (pph) | 100 | 100 |
| Ball Physicals | | |
| Pole Size (in) | 1.681 | 1.682 |
| Compression (PGA) | 83 | 87 |
| Weight (g) | 45.256 | 45.215 |
| Shore D Hardness | 54 | 55 |
| COR (at 125 ft/s) | 0.806 | 0.806 |
| Ball Properties | | |
| 175 mph Driver Spin | 2608 | 2647 |
| Driver Speed | 157.7 | 175.8 |
| 160 mph Driver Spin | 2711 | 2670 |
| Driver Speed | 160.9 | 161.8 |
| 8 Iron Spin | 7123 | 6990 |

The data in Table 3 demonstrate that it is possible to prepare a Cored Double Mantle ball having two Discrete Hardness Regions in the Single Component Region, as well as an outer intermediate layer and outer cover layer, the ball demonstrating excellent 8 iron spin, as well as high ball speed as shown by COR values in excess of 0.8 at 125 ft/s.

In view of the many possible embodiments to which the principles of this disclosure may be applied, it should be recognized that the illustrated embodiments are only preferred examples and should not be taken as limiting the scope of the invention.

We claim:

1. A golf ball comprising;
A) a golf ball core having a geometric center and an outer surface;
B) an outer cover layer having an inner and outer surface;
C) a single component region; and
D) one or more intermediate layers located between the golf ball core and the single component region, wherein the single component region spans the distance from the outer surface of said intermediate layer to the inner surface of said outer cover layer; and
wherein said single component region comprises from about 2 to about 10 discrete hardness regions each having a hardness that is different compared to at least one other discrete hardness region, each discrete hardness region having a thickness of from about 0.01 to about 0.84 inches and wherein said single component region comprises greater than 80% by weight of a polyalkenamer.

2. The golf ball of claim 1 wherein said single component region comprises from about 2 to about 8 discrete hardness regions, each discrete hardness region having a thickness of from about 0.015 to about 0.825 inches and wherein said single component region comprises greater than 85% by weight of a polyalkenamer rubber selected from the group consisting of polybutenamer rubber, polypentenamer rubber, polyhexenamer rubber, polyheptenamer rubber, polyoctenamer rubber, polynonenamer rubber, polydecenamer rubber, polyundecenamer rubber, polydodecenamer rubber, polytridecenamer rubber, and any and all combinations thereof.

3. The golf ball of claim 2 wherein said single component region comprises from about 2 to about 5 discrete hardness regions, each discrete hardness region having a thickness of from about 0.02 to about 0.5 inches and wherein said single component region comprises greater than 90% by weight of a polyalkenamer rubber selected from the group consisting of polypentenamer rubber, polyoctenamer rubber, polydodecenamer rubber, and any and all combinations thereof.

4. The golf ball of claim 1 wherein the outer cover layer or said one or more intermediate layers comprises a thermoplastic elastomer, a thermoset polyurethane, a thermoplastic polyurethane, a thermoset polyurea, a thermoplastic polyurea, a unimodal ionomer, a bimodal ionomer, a modified unimodal ionomer, a modified bimodal ionomer; and any and all combinations or mixtures thereof.

5. A golf ball comprising;
A) a golf ball core having a geometric center and an outer surface;
B) an outer cover layer having an inner and outer surface;
C) a single component region;
D) one or more inner intermediate layers located between the golf ball core and the single component region; and
E) one or more outer intermediate layers located between the single component region and the outer cover layer, wherein the single component region spans the distance from the outer surface of said inner intermediate layer to the inner surface of said outer intermediate layer; and
wherein said single component region comprises from about 2 to about 10 discrete hardness regions each having a hardness that is different compared to at least one other discrete hardness region, each discrete hardness region having a thickness of from about 0.01 to about 0.84 inches and wherein said single component region comprises greater than 80% by weight of a polyalkenamer.

6. The golf ball of claim 5 wherein said single component region comprises from about 2 to about 8 discrete hardness regions, each discrete hardness region having a thickness of from about 0.015 to about 0.825 inches and wherein said single component region comprises greater than 85% by weight of a polyalkenamer rubber selected from the group consisting of polybutenamer rubber, polypentenamer rubber, polyhexenamer rubber, polyheptenamer rubber, polyoctenamer rubber, polynonenamer rubber, polydecenamer rubber, polyundecenamer rubber, polydodecenamer rubber, polytridecenamer rubber, and any and all combinations thereof.

7. The golf ball of claim 5 wherein said single component region comprises from about 2 to about 5 discrete hardness regions, each discrete hardness region having a thickness of from about 0.02 to about 0.5 inches and wherein said single component region comprises greater than 90% by weight of a polyalkenamer rubber selected from the group consisting of polypentenamer rubber, polyoctenamer rubber, polydodecenamer rubber, and any and all combinations thereof.

8. The golf ball of claim 5 wherein the outer cover layer or said one or more intermediate layers comprises a thermoplastic elastomer, a thermoset polyurethane, a thermoplastic polyurethane, a thermoset polyurea, a thermoplastic polyurea, a unimodal ionomer, a bimodal ionomer, a modified unimodal ionomer, a modified bimodal ionomer; and any and all combinations or mixtures thereof.

9. The golf ball of claim 5, wherein said polyalkenamer is a polyoctenamer rubber, and the outer cover layer comprises thermoset polyurethane.

10. The golf ball of claim 9, wherein at least one of the intermediate layers comprises a thermoplastic elastomer.

* * * * *